United States Patent
Shimasaki et al.

[11] Patent Number: 5,503,922
[45] Date of Patent: Apr. 2, 1996

[54] MAGNETIC RECORDING MEDIUM

[75] Inventors: Yukihiro Shimasaki, Sanda; Kazunori Sakamoto, Katano; Akira Kisoda, Moriguchi; Yuji Midou, Higashiosaka, all of Japan

[73] Assignee: Matsushita Electric Industrial Co., Ltd., Kadoma, Japan

[21] Appl. No.: 313,410

[22] Filed: Sep. 27, 1994

Related U.S. Application Data

[63] Continuation of Ser. No. 716,737, Jun. 19, 1991, abandoned.

[30] Foreign Application Priority Data

Jun. 19, 1990 [JP] Japan ................................. 2-160534

[51] Int. Cl.⁶ ...................... G11B 5/66; B32B 5/16
[52] U.S. Cl. ........................ 428/323; 428/336; 428/329; 428/331; 428/328; 428/446; 428/447; 428/694 B; 428/694 BS; 428/694 BR; 428/694 BN; 428/694 BM; 428/900
[58] Field of Search ................... 428/323, 336, 428/329, 331, 328, 446, 447, 900, 694 B, 694 BS, 694 BR, 694 BN, 694 BM

[56] References Cited

U.S. PATENT DOCUMENTS

| | | | |
|---|---|---|---|
| 4,076,890 | 2/1978 | Yamada et al. | 428/337 |
| 4,451,532 | 5/1984 | Depalma et al. | 428/336 |
| 4,789,591 | 12/1988 | Nakamura et al. | 428/328 |
| 5,035,948 | 7/1991 | Saito et al. | 428/329 |
| 5,089,317 | 2/1992 | Noguchi et al. | 428/212 |

FOREIGN PATENT DOCUMENTS

| | | |
|---|---|---|
| 66039 | 12/1982 | European Pat. Off. . |
| 3408000 | 9/1985 | Germany . |
| 295838 | 5/1984 | Japan . |
| 64-59615 | 3/1989 | Japan . |

OTHER PUBLICATIONS

IEEE Trans. 1977, vol. MAG-13 No. 5.

*Primary Examiner*—L. Kiliman
*Attorney, Agent, or Firm*—Cushman, Darby & Cushman

[57] ABSTRACT

In the magnetic recording medium, the spherical particles are added in the surface magnetic layer of the magnetic film having multilayer configuration (structure). And the spherical particles have a diameter in the range of from 0.5 to 1.5 times as large as the thickness of surface magnetic layer, and the amount of the spherical particles is in the range of from 0.1 parts to 1 part per 100 parts by weight of magnetic powder included in the surface magnetic layer. Fine studs are formed on the surface of the surface magnetic layer, and it results in both small surface roughness and low coefficient of friction.

14 Claims, 1 Drawing Sheet

FIGURE

MAGNETIC RECORDING MEDIUM

This is a continuation of application Ser. No. 07/716,737, filed on Jun. 19, 1991, which was abandoned upon the filing thereof.

FIELD OF THE INVENTION AND RELATED ART STATEMENT

1. Field of the Invention

The present invention relates to a coated type magnetic recording medium (e.g. a magnetic tape and a flexible disk) for use in an audio apparatus, a video apparatus, a computer and the like.

2. Description of the Related Art

In recent years, a video apparatus for realizing high quality picture, long-time recording and small size of recording medium and an audio apparatus for utilizing digital signal have been developed. One of most Important devices for these apparatuses is a magnetic recording medium having high recording density. In the magnetic recording medium having high recording density, in order to reduce the spacing loss during recording in short wave length region, the surface roughness of the magnetic film is made very small. But, owing to the smooth surface of the magnetic film, the coefficient of friction of the same becomes large, and hence runability is deteriorated, thereby causing undesirable jitter. In order to improve smoothness of the magnetic layer surface and to lower the coefficient of friction of the same, various lubricant in a group such as higher fatty acid group, higher fatty acid ester group or fluorine group has been used.

In recent years, a video tape recorder combined with a camera in an integral body and a portable apparatus have been developed, and environmental condition for these apparatus becomes more severe. For instance, they are required to work under a wide environmental temperature range. Thus stable runability of the magnetic tape is necessary even under such severe environmental condition.

It is one of difficult problems to obtain both smooth surface and low coefficient of friction of the magnetic film as mentioned-above. Desired low coefficient of friction is realized by above-mentioned addition of a lubricant to the magnetic film. However, in case excess amount of the lubricant is added, adhesive property of the magnetic film to the non-magnetic substrate (base film) becomes poor, and further, dynamic strength of the magnetic film is decreased. Owing to decreased dynamic strength of the magnetic film, the magnetic film is worn due to contact with the magnetic head and other mechanical parts, so that fine powder of the magnetic film material is produced, thereby causing some problems. For instance the powder sticks to the magnetic head, still durability is deteriorated, and dropout is increased since the lubricant rises to the surface of the magnetic film. When the coefficient of friction is adjusted by the lubricant, undesirable temperature dependency of the coefficient of friction is caused since the lubricant has altered feature under different temperature.

OBJECT AND SUMMARY OF THE INVENTION

The present invention is intended to solve the above-mentioned problems, and purpose of the present invention is to provide a coated type magnetic recording medium having improved electromagnetic transducing characteristics and running durability.

These objects are accomplished by a magnetic recording medium comprising:

a non-magnetic substrate; and a magnetic film formed on one face of the nonmagnetic substrate, the magnetic film having a surface magnetic layer including spherical particles having a diameter in the range of from 0.5 to 1.5 times as large as the thickness of the surface magnetic layer and the amount of the spherical particles in the surface magnetic layer being in the range of from 0.1 parts to 1 parts per 100 parts by weight of magnetic powder included in the surface magnetic layer.

The thickness of the surface magnetic layer depends on the wave length of recording. That is, when usual wave length in the range of from 0.7 μm to 1.0 μm is used, most suitable thickness of the surface magnetic layer is about 0.5 μm±0.1 μm. And, when the short wave length in the range of from 0.3 μm to 0.6 μm is used, most suitable thickness of the surface magnetic layer is about 0.3 μm±0.1 μm. When the abovementioned spherical particles are added in the surface magnetic layer of the magnetic film, since the surface magnetic layer is relatively thin (usually from 0.1 μm to 1 μm), numerous studs are formed on the surface of the surface magnetic layer of the magnetic film. It results in small touching area with magnetic heads, cylinders and posts of a video tape recorder or the like. And low coefficient of friction is achieved by the small touching area of the surface magnetic layer of the magnetic film. The low coefficient of the friction owing to such shape of the surface (i.e. numerous fine studs) has little temperature dependency in comparison with the coefficient of friction controlled by the lubricant. Further, in the present invention, excess amount of lubricant as mentioned afore is never added in the magnetic film, so that such problems never occur that which are caused by the excess amount of lubricant such as poor adhesive property of the magnetic film to the non-magnetic substrate and decreased dynamic strength of the magnetic film.

In case the surface magnetic layer has a thickness more than 2 μm, the thick magnetic layer necessitates the spherical particles having large diameter or large amount of spherical particles. But the spherical particles having large diameter or large amount of the spherical particles results in undesirable drop-out and/or noise in recording/reproducing. Thus. It is not desirable to use the surface magnetic layer having thickness more than 2 μm.

Thereby, it is preferable to use the present invention in a magnetic film having multilayer structure, and it is more preferable that the surface magnetic layer of the magnetic film has a thickness in the range of from 0.1 μm to 0.6 μm. When the magnetic film is consists of only one magnetic layer which has a thickness less than 1 μm, the above-mentioned effect of the present invention is enough so that the magnetic recording medium having improved electromagnetic transducing characteristic and running durability in running is obtained. As mentioned above, the coefficient of friction of the magnetic film is determined by these spherical particles.

In order to obtain stable coefficient of friction even after repeated running of the magnetic tape, it is important that the surface of the spherical particles has good sliding characteristic, since the surface of them operates as a touching face. And further, it is important to prevent undesirable omission of the spherical particles by strengthening a binding power between the spherical particles and the binder resin(s). Then, a surface treatment of these spherical particles becomes an effective way.

The surface treatment agent used in the present invention can be chosen properly from fatty acid having at least 12 carbon atoms, for instance a lauric acid, a myristic acid a palmitic acid, a stearic acid, an oleic acid, a behenic acid and the like only, in order to give a lubricity to the spherical particles. In case, even when one of these acids is used without additive such a coupling agent, sufficient effect is obtained. But it is preferable to take a combined used of the acid and a coupling agent having an effect for increasing the binding power between the spherical particles and the binder resins.

Coupling agents for the combined use includes; silane group coupling agents, for Instance p-[N-(2-aminoethyl)aminomethyl]phenethyltrimethoxysilane; N-(2-aminoethyl)-3-aminopropylmethyldimetoxysilane; N-(2-aminoethyl)-3-aminopropyltrimethoxysilane; 1-(3-aminopropyl)-1, 1,3,3,3-pentamethyldisiloxane;
3-aminopropyltriethoxysilane; 3-aminopropyltris(trimethylsiloxy)silane; γ-(2-aminoethyl)aminopropyltrimethoxysilane; γ-(2-aminoethyl)aminopropylmethyldimethoxysilane; γ-glycidoxypropyltrimetoxysilane; γ-mercaptopropyltrimethoxysilane and the like; and titanate group coupling agents for instance isopropyltriisostearoyltitanate; isopropyltris(diocthylpyrophoshate)titanate; isopropyltri(N-aminoethyl-aminoethyl)titanate; tetraocthylbis(ditridecylphosphate)titanate; bis(diocthylpyrophosphate)oxyacetatetitanate; bis(diocthylpyrophosphate)ethylenetitanate; isopropyltrioctanoyltitanate; isopropyltridecylbenzensulfonyltitanate; isopropyltri(diocthylphosphate)titanate;
tetrapropylbis(dioctylphosphate)titanate and the like.

Even in case, when one of the above-mentioned coupling agents is used without an acid, a sufficient effect for a good sliding characteristic is obtainable. As to the coupling agent having no long-chain alkyl group, however, the combined use with the afore-mentioned fatty acid is more preferable.

In the present invention, a slight amount of the spherical particles is added in the surface magnetic layer of the magnetic film to obtain both small surface roughness and low coefficient of friction. Further, additionally the surface treatment can be carried out to prevent omission of the spherical particles and to achieve good lubricity of the same, more stable runability during many repetition of running is obtainable. Thus, the magnetic recording medium having improved electromagnetic transducing characteristic and running durability in running is obtained.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

Attached figure is a cross-sectional view of a video tape sample of Experiment 1 embodiment the present invention.

It will be recognized that the figure is schematic representation for purpose of illustration and does not necessarily depict the actual relative size or location of the elements shown.

DESCRIPTION OF THE PREFERRED EMBODIMENTS

Figure 1:
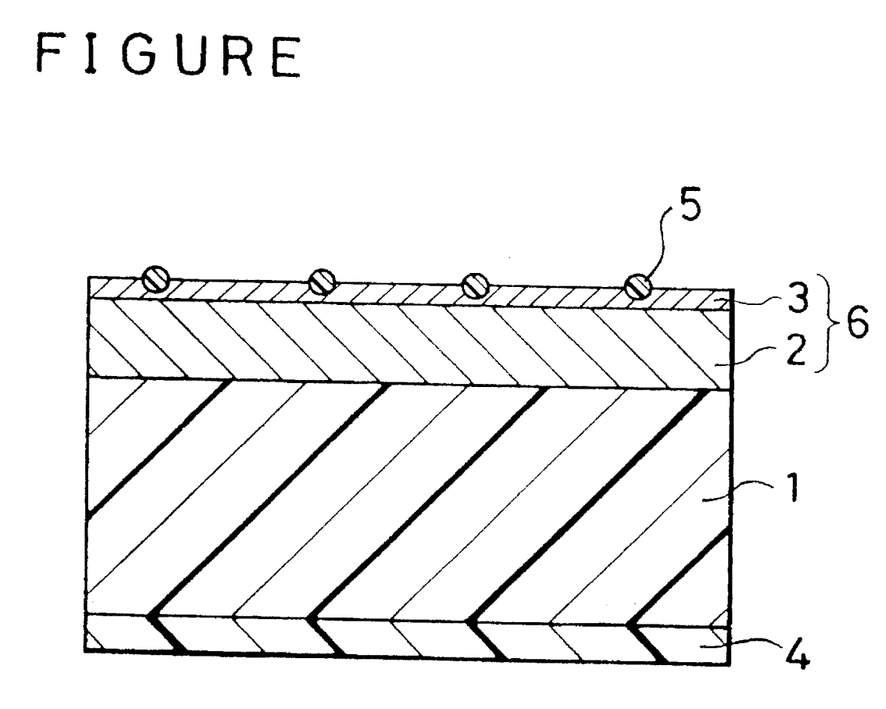

The present invention is elucidated in detail with reference to the accompanying drawing and the following Experiments.

Attached figure is a cross-sectional view of a coated type magnetic recording medium of the present invention. In the figure, an underneath magnetic layer 2 is formed on a non-magnetic base film 1, a surface magnetic layer 3 is formed on the underneath magnetic layer 2, and a back coat layer 4 is formed on the side, which is opposite to the side of the surface magnetic layer 3, of the base film 1. Spherical particles 5 included in the surface magnetic layer 3 make a plenty of studs. A magnetic film 6 is consists of the surface magnetic layer 3 and the underneath magnetic layer 2. That is, the magnetic film 6 has a structure of multilayer.
[Preparation for a magnetic coating material for the surface magnetic layer]

A magnetic coating material herein referred to as [SM] for the surface magnetic layer 3 was prepared by the following steps.

Step(A): Adequate amount of an organic solvent mixture $*1)$ was added in the following materials to make a composition having suitable viscosity:

Magnetic powder $*2)$ . . . 10 parts $*4)$

Spherical particles $*3)$ . . . 0.2 parts

Alumina($Al_2O_3$) . . . 7 parts

Polyvinyl chloride group resin . . . 10 parts

Polyurethane resin . . . 10 parts.

$*1)$ The organic solvent mixture consists of (Methylethylketone: Toluene: Cyclohexanone=3:3:1)

$*2)$ The magnetic powder was selected from the following material shown in Table 1.

TABLE 1

| Magnetic powder | BET specific surface area ($mm^2/g$) | Coercive force Oe |
|---|---|---|
| Material A (Ironoxide: Co-$\gamma Fe_2O_3$) | 47 | 680 |
| Material B (Ironoxide: Co-$\gamma Fe_2O_3$) | 48 | 950 |
| Material C (Metal particles including 95 wt % of iron) | 51 | 1520 |

$*3)$ Spherical particles can be chosen properly from: spherical particles of silicon dioxide, thermal black and the like. The kind of spherical particles was selected from the following materials shown in Table 2. An experiment of the spherical particles of silicon dioxide is "SEAHOSTAR" (trade name) supplied by NIPPON SHOKUBAI KAGAKU KOGYO CO., LTD. JAPAN. Several types of the "SEAHOSTAR" having a diameter in respective range i.e. 0.2 μm, 0.5 μm, 0.7 μm or 1.0 μm in the area of from 0.2 μm to 1.2 μm are obtainable. And in each range, distribution (scattering) of the diameter is controlled to be small. An experiment of the thermal black is "ASAHI THERMAL" (trade name) (having a mean diameter of 0.15 μm and the range of diameter is from 0.05 μm to 0.2 μm) supplied by ASAHI CARBON CO., LTD. JAPAN or is "SEVACARB MT" (trade name) (having a mean diameter of 0.67 μm and the range of diameter is from 0.10 μm to 1.5 μm) supplied by Columbian Chemical Company U.S.A. The particle distribution (scattering) of these thermal black size is broader than the particle size distribution of the above-mentioned spherical particles of silicon dioxide.

$*4)$ Hereinafter parts of components are all by weight.

TABLE 2

| No. | Trade name | Supplier | Mean diameter | Surface treatment agent |
|---|---|---|---|---|
| 1 | SEAHOSTAR type KE-P20 | NIPPON SHOKUBAI KAGAKU KOGYO CO., LTD. JAPAN | 0.2 μm | No surface treatment was made |
| 2 | SEAHOSTAR type KE-P50 | NIPPON SHOKUBAI KAGAKU KOGYO CO., LTD. JAPAN | 0.5 μm | No surface treatment was made |
| 3 | SEAHOSTAR type KE-P70 | NIPPON SHOKUBAI KAGAKU KOGYO CO., LTD. JAPAN | 0.7 μm | No surface treatment was made |
| 4 | SEAHOSTAR type KE-P100 | NIPPON SHOKUBAI KAGAKU KOGYO CO., LTD. JAPAN | 1.0 μm | No surface treatment was made |
| 5 | SEAHOSTAR type KE-P20 | NIPPON SHOKUBAI KAGAKU KOGYO CO., LTD. JAPAN | 0.2 μm | Isopropyltriisostearoyltitanate (1.5 parts)[*5] |
| 6 | SEAHOSTAR type KE-P70 | NIPPON SHOKUBAI KAGAKU KOGYO CO., LTD. JAPAN | 0.7 μm | Isopropyltriisostearoyltitanate (1.5 parts)[*5] |
| 7 | ASAHI THERMAL | ASAHI CARBON CO., LTD. JAPAN | 0.15 μm | Myristic acid (1.0 parts)[*5] + 3 – aminopropyltriethoxysilane (0.5 parts)[*5] |
| 8 | SEVACARB MT | Columbian Chemical Company U.S.A. | 0.67 μm | Isopropyltriisostearoyltitanate (1.5 parts)[*5] |
| 9 | SEVACARB MT | Columbian Chemical Company U.S.A. | 0.67 μm | Myrstic acid (1.0 parts)[*5] + 3 – aminopropyltriethoxysilane (0.5 parts)[*5] |

[*5]The amount of the surface treatment agent per 100 parts of the spherical particles.

Step(B): Milling and dispersion of the composition were made in a two axial type kneading mixer and further in a sand mill to make an admixture;

Step(C): The following lubricant and hardener were added in the composition, and the composition as the magnetic coating material [SM] for the surface magnetic layer was adjusted to have 30 weight % of solid content by addition of the organic solvent mixture.

| [Lubricant] | |
|---|---|
| Myristic acid | 2 parts |
| Stearic acid | 1 part |
| n-Butyl stearate | 1 part |
| [Hardening] | |
| Polyisocyanate | 4 parts. |

[Preparation for a magnetic coating material for the underneath magnetic layer]

A magnetic coating material herein after referred to as [UM] for the underneath magnetic layer 4 was prepared by the same procedure of the coating magnetic material [SM] except that carbon black (average particle size=0.02 μm) was used instead of the spherical particle.

Experiment 1

In this Experiment 1, a diameter of the spherical particle used in the surface magnetic layer was changed in respective samples and comparison samples. Samples 1-1, 1-2, 1-3 and 1-4 and Comparison samples 1-1, 1-2 and 1-3 were formed in this Experiment 1.

[Sample 1-1]

Video-tape samples of the Sample 1-1 were made by the following procedure:

Step(a): A magnetic coating material [UM] for the underneath magnetic layer was prepared by using the material A shown In Table 1;

Step(b): The magnetic coating material [UM] was applied on a 10-μm thick polyethylene telephthalate film as the non-magnetic base film 1, dried and subjected to a calendering process to form a 3 μm thick underneath magnetic layer 2;

Step(c): A magnetic coating material [SM] for the surface magnetic layer was prepared by using the material B shown in Table 1 and the spherical particles No.1 shown in Table 2;

Step(d): The magnetic coating material [SM] was applied on the underneath magnetic layer 2, dried and subjected to a calendering process to form a 0.5 μm thick surface magnetic layer 3, and curing(hardening) at 50° C. was carried out for 48 hours. And the resultant 0.5 μm thick surface magnetic layer is suitable for recording of usual wave length. The thickness of 0.5 μm has the amount of scatter, so the thickness of 0.5 μm was in the range between 0.4 μm and 0.6 μm.;

Step(e): An admixture for the back coat layer 4 mainly including carbon black was applied on opposite face of the non-magnetic base film 1 to the one face coated by the magnetic film 6 and dried to form a 0.7 μm thick back coat layer 4; and Step(f): The applied film was slit to give ½ inch video tape of samples, which are set in video tape cassettes.

[Samples 1-2, 1-3 and 1-4]

Video-tape samples of these Samples 1-2, 1-3 and 1-4 were made by the same procedure as that of the Sample 1-1 except that the diameter of the spherical particles used in the Step(c) was varied as follows:

In the Sample 1-2, the spherical particles No.2 shown in Table 2 was used,

In the Sample 1-3, the spherical particles No.3 shown in Table 3 was used, and

In the Sample 1-4, the spherical particles No.4 shown in table 2 was used.

[Comparison sample 1-1]

Video-tape samples of this Comparison sample 1-1 were made by the same procedure as that of the Sample 1-1 except that no spherical particle was used in the Step(c).

[Comparison sample 1-2]

Video-tape samples of this Comparison samples 1-2 was made by the same procedure as that of the Sample 1-2 except omission of the Steps(a) and (b), hence omission of forming the underneath magnetic layer 2. And in the step(d) a 3.5 μm thick surface magnetic layer 3 was formed. That is, in the Comparison sample 1-2, the magnetic film 6 has exceedingly thick surface magnetic layer 3.

[Comparison sample 1-3]

Video-tape samples of this Comparison sample 1-3 were made by the same procedure as that of the Comparison sample 1-2 except that in the Step(c) the spherical particles No.3 shown in Table 2 was used. That is, in the Comparison sample 1-3, the magnetic film 6 was also has exceedingly thick surface magnetic layer 3.

The following evaluation tests were made on different video tape samples obtained in the Experiment 1.

(1)[Surface roughness of the magnetic film]

"NV-FS900" manufactured by Matsushita Electric Industrial Co., Ltd. JAPAN. 7 MHz correspond a usual wave length (i.e. 0.82 μm) in recording. The C/N ratio was expressed in terms of relative value to the C/N ratio of a tape obtained in the Comparison sample 1-1 which was assumed to be 0 dB.

Table 3 shows results of these evaluation tests as to respective sample tapes.

TABLE 3

| Sample | | | Surface roughness Ra (nm) | Coefficient of friction | | | | C/N*² ratio (d/B) |
|---|---|---|---|---|---|---|---|---|
| | | | | 3° C. | 23° C. | 40° C. | Stability*¹ | |
| Sample 1-1 | (a) | SEAHOSTAR type KE-P20; 0.2 μm; No. 1 | 3.8 | 0.33 | 0.32 | 0.30 | 0.33 | +0.1 |
| | (b) | The surface magnetic layer and the underneath magnetic layer | | | | | | |
| | (c) | No surface treatment was made | | | | | | |
| Sample 1-2 | (a) | SEAHOSTAR type KE-P50; 0.5 μm; No. 2 | 4.1 | 0.29 | 0.26 | 0.24 | 0.26 | +0.2 |
| | (b) | The surface magnetic layer and the underneath magnetic layer | | | | | | |
| | (c) | No surface treatment was made | | | | | | |
| Sample 1-3 | (a) | SEAHOSTAR type KE-P70; 0.7 μm; No. 3 | 4.2 | 0.26 | 0.25 | 0.23 | 0.29 | −0.1 |
| | (b) | The surface magnetic layer and the underneath magnetic layer | | | | | | |
| | (c) | No surface treatment was made | | | | | | |
| Sample 1-4 | (a) | SEAHOSTAR type KE-P100; 1.0 μm; No. 4 | 5.6 | 0.27 | 0.27 | 0.24 | 0.24 | −1.5 |
| | (b) | The surface magnetic layer and the underneath magnetic layer | | | | | | |
| | (c) | No surface treatment was made | | | | | | |
| Comparison sample 1-1 | (a) | No spherical particles | 3.8 | 0.39 | 0.35 | 0.32 | 0.42 | ±0 (Standard) |
| | (b) | The surface magnetic layer and the underneath magnetic layer | | | | | | |
| | (c) | — | | | | | | |
| Comparison sample 1-2 | (a) | SEAHOSTAR type KE-P50; 0.5 μm; No. 2 | 3.9 | 0.37 | 0.36 | 0.33 | 0.38 | +0.1 |
| | (b) | Only the surface magnetic layer | | | | | | |
| | (c) | No surface treatment was made | | | | | | |
| Comparison sample 1-3 | (a) | SEAHOSTAR type KE-P70; 0.7 μm; No. 3 | 3.8 | 0.35 | 0.31 | 0.29 | 0.38 | +0.2 |
| | (b) | Only the surface magnetic layer | | | | | | |
| | (c) | No surface treatment was made | | | | | | |

*¹The value was measured after repeating 200 times of round-trip running under 20 g-tension at winding-in side to the post.
*²The C/N ratio was expressed in terms of relative value to the C/N ratio of a tape obtained in the Comparison sample 1-1 which was assmed to be 0 dB.

Surface roughness of the magnetic film was measured by a non-contact type three dimensional surface roughness meter "TOPO-3D" manufactured by WYKO CO., LTD. U.S.A.

(2)[Coefficient of friction of the magnetic film]

The tape sample was wound on and around a post of 3 mmϕ made of stainless steel at a winding angle of 180°; tension at winding in side of the post was 20.0 g; and the sliding speed was 5 cm/sec. The coefficient of friction was obtained by measured tension at feeding-out side of the post and the tension at the winding-in side.

In order to obtain temperature dependency of the coefficient of friction, measurements were made at the environmental temperatures of 3° C., 23° C. and 40° C.

In order to test stability of the coefficient of friction, the coefficient of friction was measured after repeating 200 times of the above-mentioned round-trip running under the condition of 20 gr tension at winding-in side and at room temperature.

(3) [Carrier-to-noise ratio]

Since a Carrier-to-noise ratio (hereinafter it is abbreviated to C/N ratio) is considered to be influenced by the surface roughness of the magnetic film, a C/N ratio at 7 MHz±1 MHz was examined by using a VHS system VTR type From results shown in Table 3, the Sample 1-1 wherein the spherical particles having a diameter of 0.2 μm which is less than only a half of the thickness (i.e. 0.5 μm ) of the surface magnetic layer were used, showed relatively smaller coefficient of friction than that of the Comparison sample 1-1. But effect obtained in the Sample 1-1 was not large.

In contrast, the Sample 1-2, 1-3 and 1-4 wherein the spherical particles No.2, No.3 and No.4 used respectively showed remarkable good coefficient of friction at every environmental temperature and good stability of the same. But, in the Sample 1-4, the spherical particles having a diameter of 1.0 μm which is two times as large as the thickness (i.e. 0.5 μm) of the surface magnetic layer were used, so that the surface roughness become large. And it induced a bad influence on the C/N ratio.

Although the spherical particles were used in the Comparison samples 1-2 and 1-3, they showed little reduction of the coefficient of friction and little effect owing to addition of the spherical particles, since the magnetic film of the Comparison samples 1-2 and 1-3 has the excessively thick (i.e. 3.5 μm) surface magnetic layer. In our experiment, the surface magnetic layer which has a thickness less than about 1 μm showed sufficient effect of the spherical particles. And the magnetic recording medium which has a thin surface magnetic layer (i.e. from 0.3 μm to 1 μm) as a magnetic film is used for a flexible disk or the like.

Experiment 2

In this Experiment 2, the amount of the spherical particles added in the surface magnetic layer was changed in the Step(A) of [Preparation for a magnetic coating material for the surface magnetic layer] in respective samples. Samples 2-1, 2-2, 2-3, 2-4 and 2-5 were formed in this Experiment 2.

[Samples 2-1, 2-2, 2-3, 2-4 and 2-5]

Video-tape samples of these Samples 2-1, 2-2, 2-3, 2-4 and 2-5 were made by the same procedure as that of the Sample 1-3 except that the amount of the spherical particles was changed as follows.

in the Sample 2-1, the amount was 0.05 parts per parts of the magnetic powder, in the Sample 2-2, the amount was 0.1 parts per parts of the magnetic powder, in the Sample 2-3, the amount was 0.5 parts per 100 parts of the magnetic powder, in the Sample 2-4, the amount was 1.0 parts per 100 parts of the magnetic powder, and in the Sample 2-5, the amount was 1.2 parts per 100 parts of the magnetic powder.

The afore-mentioned evaluation tests were made oil different video tape samples obtained in this Experiment 2. Table 4 shows results of the evaluation tests as to the respective sample tapes including the Sample 1-3 and the Comparison sample 1-1 of the Experiment 1.

Experiment 3

Effect of a surface treatment on the spherical particles was studied in this Experiment 3.

Two type of surface treatment wherein different surface treatment agent used respectively, were carried out to prevent omission of the spherical particles and to achieve good lubricity of the same.

[Sample 3-1]

Video-tape samples of this Sample 3-1 were made by the same procedure as that of the Sample 1-3 except that the spherical particles after a surface treatment (i.e. No.6 shown in Table 2) was used. The surface treatment was made by using 1.5 parts of isopropyltriisostearoyltitanate per 100 parts of the spherical particles. The isopropyltriisostearoyltitanate is one of titanate group coupling agents.

[Sample 3-2]

Video-tape samples of tills Sample 3-2 were made by the same procedure as that of the Sample 3-1 except that 0.2 parts of the "SEVACARB MT" after the same surface treatment (i.e. No.8 shown in Table 2) as that of Sample 3-1 was used as the spherical particles instead of the "SEAHOSTAR" type KE-P70" (i.e. No.6 shown in Table 2).

[Sample 3-3]

Video-tape samples of this Sample 3-3 were made by the same procedure as that of the Sample 3-2 except that the "SEVACARB MT" after a different surface treatment (i.e. No.9 shown in Table 2) was used. That is, the different

TABLE 4

| Sample | (a) Name, diameter and No. in Table 1 of spherical particles: (b) Amount of spherical particles per 100 parts of the magnetic powder (c) Surface treatment | Surface roughness Ra (nm) | Coefficient of friction 3° C. | 23° C. | 40° C. | Stability*[1] | C/N*[2] ratio (d/B) |
|---|---|---|---|---|---|---|---|
| Sample 2-1 | (a) SEAHOSTAR type KE-P70; 0.7 μm; No. 3<br>(b) 0.05 parts<br>(c) No surface treatment was made | 3.8 | 0.33 | 0.31 | 0.31 | 0.34 | +0.2 |
| Sample 2-2 | (a) SEAHOSTAR type KE-P70; 0.7 μm; No. 3<br>(b) 0.1 parts<br>(c) No surface treatment was made | 4.1 | 0.28 | 0.27 | 0.25 | 0.28 | +0.1 |
| Sample 2-3 | (a) SEAHOSTAR type KE-P70; 0.7 μm; No. 3<br>(b) 0.5 parts<br>(c) No surface treatment was made | 4.2 | 0.27 | 0.26 | 0.25 | 0.26 | 0.0 |
| Sample 2-4 | (a) SEAHOSTAR type KE-P70; 0.7 μm; No. 3<br>(b) 1.0 parts<br>(c) No surface treatment was made | 4.5 | 0.26 | 0.25 | 0.25 | 0.27 | −0.2 |
| Sample 2-5 | (a) SEAHOSTAR type KE-P70; 0.7 μm; No. 3<br>(b) 1.2 parts<br>(c) No surface treatment was made | 4.9 | 0.25 | 0.24 | 0.25 | 0.27 | −0.7 |
| Sample 1-3 | (a) SEAHOSTAR type KE-P70; 0.7 μm; No. 3<br>(b) 0.2 parts<br>(c) No surface treatment was made | 4.2 | 0.26 | 0.25 | 0.23 | 0.29 | −0.1 |
| Comparison sample 1-1 | (a) No spherical particles<br>(b) —<br>(c) — | 3.8 | 0.39 | 0.35 | 0.32 | 0.42 | ±0 (Standard) |

*[1]The value was measured after repeating 200 times of round-trip running under 20 g-tension at winding-in side to the post.
*[2]The C/N ratio was expressed in terms of relative value to the C/N ratio of a tape obtained in the Comparison sample 1-1 which was assmed to be 0 dB.

From results shown in Table 4, 0.05 parts of the spherical particles showed some effect for lowering the coefficient of friction indeed, but it is necessary to add more than 0.1 parts of the same in order to obtain remarkable effect. When an excess amount of (i .e. 1.2 parts) of the spherical particles were added as shown in the sample 2-5, the surface roughness undesirably became large, so that the C/N ratio was worsened.

surface treatment was made by using both 1.0 parts of myristic acid and 0.5 parts of 3-aminopropyltriethoxysilane per 100 parts of the spherical particles. The myristic acid Is one of fatty acid, and the 3-aminopropyltriethoxysilane is one of silane group coupling agent.

The afore-mentioned evaluation tests were made on different video tape samples obtained in this Experiment 3. Table 5 shows results of the evaluation tests as to the respective sample tapes including the Sample 1-3 of the Experiment 1.

TABLE 5

| Sample | | | Surface roughness Ra (nm) | Coefficient of friction | | | | C/N ratio (d/B) |
|---|---|---|---|---|---|---|---|---|
| | | | | 3° C. | 23° C. | 40° C. | Stability | |
| | (a) | Name, diameter and No. in Table 1 of spherical particles: | | | | | | |
| | (b) | Components layers of the magnetic film: | | | | | | |
| | (c) | Surface treatment | | | | | | |
| Sample 3-1 | (a) | SEAHOSTAR type KE-P70; 0.7 μm; No. 6 | 4.0 | 0.28 | 0.26 | 0.24 | 0.26 | +0.2 |
| | (b) | The surface magnetic layer and the underneath magnetic layer | | | | | | |
| | (c) | Isopropyltriisostearoyltitanate (1.5 parts)*³ | | | | | | |
| Sample 3-2 | (a) | SEVACARB MT; 0.67 μm; No. 8 | 4.1 | 0.25 | 0.25 | 0.23 | 0.24 | +0.1 |
| | (b) | The surface magnetic layer and the underneath magnetic layer | | | | | | |
| | (c) | Isopropyltriisostearoyltitanate (1.5 parts)*³ | | | | | | |
| Sample 3-3 | (a) | SEVACARB MT; 0.67 μm; No. 9 | 3.9 | 0.26 | 0.25 | 0.24 | 0.25 | +0.5 |
| | (b) | The surface magnetic layer and the underneath magnetic layer | | | | | | |
| | (c) | Myrstic acid (1.0 parts)*³ + 3 − aminipropyltriethoxysilane (0.5 parts)*³ | | | | | | |
| Sample 1-3 | (a) | SEAHOSTAR type KE-P70; 0.7 μm; No. 3 | 4.2 | 0.26 | 0.25 | 0.23 | 0.29 | −0.1 |
| | (b) | The surface magnetic layer and the underneath magnetic layer | | | | | | |
| | (c) | No surface treatment was made | | | | | | |

*¹The value was measured after repeating 200 times of round-trip running under 20 g-tension at winding-in side to the post.
*²The C/N ratio was expressed in terms of relative value to the C/N ratio of a tape obtained in the Comparison sample 1-1 which was assmed to be 0 dB.
*³The amount of the surface treatment agent per 100 parts of the spherical particles.

From the results shown in Table 5, effect of the surface treatment was not so large, but certain effect upon the stability of the coefficient of friction was shown. That is, after repeating round-trip running, remarkably stable coefficient of friction was obtained.

Suitable coupling agents for the surface treatment of the present invention includes: silane group coupling agents, for instance p-[N-(2-aminoethyl)aminomethyl]phenethyltrimethoxysilane; N-(2-aminoethyl)-3-aminopropylmethyldimetoxysilane; N-(2-aminoethyl)-3-aminopropyltrimethoxysilane; 1-(3-aminopropyl)-1,1,3,3,3-pentamethyldisiloxane; 3-aminopropyltriethoxysilane; 3-aminopropyltris(trimethylsiloxy)silane; γ-(2-aminoethyl)aminopropyltrimethoxysilane; γ-(2-aminoethyl)aminopropylmethyldimethoxysilane; γ-glycidoxypropyltrimetoxysilane; γ-mercaptopropyltrimethoxysilane and the like; and titanate group coupling agents for instance isopropyltriisostearoyltitanate; isopropyltris(diocthylpyrophoshate)titanate; isopropyltri(N-aminoethyl-aminoethyl)titanate; tetraocthylbis(ditridecylphosphate)titanate; bis(diocthylpyrophosphate)oxyacetatetitanate; bis(diocthylpyrophosphate)ethylenetitanate; isopropyltrioctanoyltitanate; isopropyltridecylbenzensulfonyltitanate; isopropyltri(diocthylphosphate)titanate; tetrapropylbis(dioctylphosphate)titanate and the like.

There are a several ways for the surface treatment. For instance, the following procedure is elucidated as a one experiment:

(a) Spherical particles are thrown into a planetary mixer;

(b) The surface treatment agent is added little by little, while the fine particles are mixed by rotation of blades;

(c) Hot water at 50° C. is flown in a cooling jacket of the planetary mixer vessel during mixing; and (d) The mixing is made for two hours after addition of the surface treatment agent.

The amount of the added surface treatment agent varies with the surface area of the spherical particles. The preferable amount of the agent is in the range of from 0.5 parts to 3 parts per 100 parts of the spherical particles.

The above-mentioned Experiments 1, 2 and 3 relate to a Co-γFe$_2$O$_3$ type magnetic recording medium which is conventionally used in usual wave length of recording. The present invention is further applicable to a metal particles type magnetic recording medium which is suitable for use in short wave length of recording. The following Experiments 4 and 5 relate to the metal particles type magnetic recording medium.

Experiment 4

Samples 4-1, 4-2, 4-3, 4-4 and 4-5 and Comparison sample 4-1 were formed in tills Experiment 4.

[Sample 4-1]

Video-tape samples of this Sample 4-1 were made by the same procedure as that of the Sample 1-1 except that:

in the Step(a): the magnetic coating material [UM] for the underneath magnetic layer was prepared by using the material B (Iron oxide) (which has relatively large coercive force than that of the material A) shown Table 1;

In the Step(e): the magnetic coating material. [SM] for the surface magnetic layer was prepared by using the material C (metal particles) shown in Table 1 and the amount of the spherical particles was changed to 0.3 parts from 0.2 parts; and in the Step(d): the magnetic coating material [SM] was applied, dried and subjected to a calendering process to form a 0.8 μm thick surface magnetic layer 3. And this 0.8 μm thick surface magnetic layer is suitable For short wave length of recording. The thickness of 0.3 μm has the amount of scatter, so the thickness of 0.8 μm was in the range between 0.2 μm and 0.4 μm. The sample 4-1 having the surface magnetic layer is one of metal particles type magnetic recording media.

[Samples 4-2, 4-3, 4-4 and 4-5]

Video-tape samples of these Samples 4-2, 4-3, 4-4 and 4-5 were made by the same procedure as that of the Sample 4-1 except that the kind of the spherical particles used in the Step(c) was as follows:

In the Sample 4-2, the spherical particles No.2 shown in Table 2 was used,

In the Sample 4-3, the spherical particles No.3 shown in Table 2 was used.

In the Sample 4-4, the spherical particles No.5 shown in Table 2 was used, and

In the Sample 4-5, the spherical particles No.7 shown in Table 2 was used.

[Comparison sample 4-1]

Video-tape samples of this Comparison sample 4-1 were made by the same procedure as that of the Sample 4-1 except that no spherical particles was used in the Step(c).

The afore-mentioned evaluation tests except the evaluation test of [C/N ratio] were made on different video tape samples obtained in this Experiment 4. In this Experiment 4 and next Experiment 5, an evaluation test of [C/N ratio at short wave length] was made, since the Experiments 4 and 5 relate to the metal particles type magnetic recording medium. Table 6 shows results of the evaluation tests as to the respective sample tapes.

[C/N ratio at short wave length]

Since a C/N ratio is considered to be influenced by the surface roughness of the magnetic film, a C/N ratio at 7.7 MHz±1 MHz was examined by using a Hi-Band 8 mm system VTR type "CCD-V900" manufactured by Sony CORPORATION JAPAN. 7.7 MHz corresponds a short wave length (i.e. 0.49 µm) of recording. The C/N ratio at short wave length was expressed in terms of relative value to the C/N ratio at short wave length of a tape obtained in the Comparison sample 4-1 which was assumed to be 0 dB. It is a matter of course that in this evaluation test, samples and comparison samples set in 8 mm video tape cassette were used.

low coefficient of friction was obtained. The Samples 4-2 and 4-3 wherein the spherical particles having a diameter (i.e. 0.5 µm and 0.7 µm) which is larger than one and a half times of the thickness (i.e. 0.3 µm) of the surface magnetic layer were used showed low and stable coefficient of friction, but reduced C/N ratio was observed owing to worsened surface roughness. Thus the spherical particles used in the surface magnetic layer should have a diameter in the range of from 0.5 to 1.5 times as large as the thickness of the surface magnetic layer as the same. And further, as to recording in short wave length, demand for recording/reproducing characteristic becomes more severe, and therefore more preferable range of the diameter of the spherical particles is from 0.15 µm to 0.2 µm.

In the metal particle type magnetic recording medium, the magnetic powder used in the underneath magnetic recording layer will be changed according to desirable magnetic characteristic. In our experiment, in case the magnetic powder used in the underneath magnetic recording layer was changed, similar result as mentioned above was obtained.

The following evaluation test was selectively made on different video tape samples obtained in the foregoing Experiments.

[Running durability]

After repeating 100 times of running by the VHS system VTR type "NV-FS900" (in a playback state at a running speed of 3.3 cm/sec) of each video tape samples under the condition of 40° C. 80% RH, the shape and damage of the tape were observed.

The test of [Running durability] was made oil the Samples 1-2, 1-3, 2-1, 2-2, 3-1, 3-3 and 4-4 and the Comparison samples 1-1, 1-2, and 4-1. And Table 7 shows results of the test.

TABLE 6

| Sample | | | Surface roughness Ra (nm) | Coefficient of friction | | | | C/N*2 ratio (dB) |
|---|---|---|---|---|---|---|---|---|
| | | (a) Name, diameter and No. in Table 1 of spherical particles: (b) Thickness of the surface magnetic layer (c) Surface treatment | | 3° C. | 23° C. | 40° C. | Stability*1 | |
| Sample 4-1 | (a) | SEAHOSTAR type KE-P20; 0.2 µm; No. 1 | 3.8 | 0.25 | 0.25 | 0.23 | 0.26 | +0.1 |
| | (b) | 0.3 µm | | | | | | |
| | (c) | No surface treatment was made | | | | | | |
| Sample 4-2 | (a) | SEAHOSTAR type KE-P50; 0.5 µm; No. 2 | 4.2 | 0.24 | 0.24 | 0.24 | 0.24 | −0.5 |
| | (b) | 0.3 µm | | | | | | |
| | (c) | No surface treatment was made | | | | | | |
| Sample 4-3 | (a) | SEAHOSTAR type KE-P70; 0.7 µm; No. 3 | 4.6 | 0.24 | 0.23 | 0.24 | 0.24 | −1.1 |
| | (b) | 0.3 µm | | | | | | |
| | (c) | No surface treatment was made | | | | | | |
| Sample 4-4 | (a) | SEAHOSTAR type KE-P20; 0.2 µm; No. 5 | 3.8 | 0.26 | 0.25 | 0.25 | 0.26 | +0.1 |
| | (b) | 0.3 µm | | | | | | |
| | (c) | Isopropyltriisostearoyltitanate (1.5 parts)*3 | | | | | | |
| Sample 4-5 | (a) | ASAHI THERMAL; 0.15 µm; No. 7 | 3.7 | 0.24 | 0.25 | 0.23 | 0.25 | +0.3 |
| | (b) | 0.3 µm | | | | | | |
| | (c) | Myrstic acid (1.0 parts)*3 + 3 − aminopropyltriethoxysilane (0.5 parts)*3 | | | | | | |
| Comparison sample 4-1 | (a) | No sherical particles | 3.5 | 0.39 | 0.36 | 0.36 | 0.41 | ±0 (Standard) |
| | (b) | 0.3 µm | | | | | | |
| | (c) | — | | | | | | |

*1The value was measured after repeating 200 times of round-trip running under 20 g-tension at winding-in side to the post.
*2The C/N ratio at short wave length was expressed in terms of relative value to the C/N ratio at short wave length of a tape obtained in the Comparison sample 4-1 which was assmed to be 0 dB.
*3The amount of the surface treatment agent per 100 parts of the spherical particles.

From results shown in Table 6, the metal particle type magnetic recording medium having thin surface magnetic layer (i.e. 0.3 µm thick surface magnetic layer) showed significant effect of the spherical particles, and stable and

TABLE 7

| | | Observation after the test of [Running durability] |
|---|---|---|
| Sample 1-2 | Good: | No undulant-shaped side edge of a tape was observed, and no fold of side edge of a tape was observed. |
| Sample 1-3 | Good: | No undulant-shaped side edge of a tape was observed, and no fold of side edge of a tape was observed. |
| Comparison sample 1-1 | Very poor: | Numerous folds of side edge of a tape, numerous parts of undulant-shaped side edge of a tape and powder on the head were observed. |
| Comparison sample 1-2 | Very poor: | Numerous folds of side edge of a tape and numerous parts of undulant-shaped side edge of a tape were observed. |
| Sample 2-1 | Poor: | Some parts of undulant-shaped side edge of a tape were observed. |
| Sample 2-2 | Good: | No undulant-shaped side edge of a tape was observed, and no fold of side edge of a tape was observed. |
| Sample 3-1 | Good: | No undulant-shaped side edge of a tape was observed, and no fold of side edge of a tape was observed. |
| Sample 3-3 | Good: | No undulant-shaped side edge of a tape was observed, and no fold of side edge of a tape was observed. |
| Sample 4-4 | Good: | No undulant-shaped side edge of a tape was observed, and no fold of side edge of a tape was observed. |
| Comparison sample 4-1 | Very poor: | Numerous folds of side edge of a tape, numerous parts of undulant-shaped side edge of a tape and powder on the head were observed. |

From results shown in Table 7, the following conclusions were obtained:

The Comparison samples 1-1 and 4-1 wherein no spherical particles was used, showed large coefficient of friction. It resulted in unusual running in the VTR, so that numerous undulant-shaped side edge and folds of side edge were observed.

Though the spherical particles were used in the Comparison sample 1-2, effect of the spherical particles was not obtained, because large thickness of the magnetic film consists of only one surface magnetic layer. Thus, the Comparison sample 1-2 showed large coefficient of friction. It resulted in unusual running in the VTR, so that numerous undulant-shaped side edge and folds of side edge were observed.

The Sample 2-1 wherein a small amount of the spherical particles were used, showed a little effect, so that some deformation such as undulant-shaped side edge were observed.

The other Samples shown in Table 1 showed sufficient effect of the spherical particles, so that unusual change was not observed.

In our experiment, material of magnetic powder used in the magnetic film had no relation with effect of the present invention.

Apart from the magnetic tape of these Experiments 1 - - - 5, further experiments of flexible disk were made similarly in our experiment, and sufficient effect was obtained.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A magnetic recording medium comprising, a non-magnetic substrate and a magnetic film which contains one or more layers and is present on one face of said non-magnetic substrate, said magnetic film having in said layers at least a surface magnetic layer which contains:

magnetic powder;

alumina particles; and spherical particles forming stud structures due to differences between the diameter of the spherical particles and the thickness of the surface magnetic layer wherein the spherical particles have diameters in the range of from 0.5 to 1.5 times as large as the thickness of said surface magnetic layer and are present in the surface magnetic layer in an amount within the range of from 0.1 parts to 1 part per 100 parts by weight of the magnetic powder, said spherical particles being selected from silicon dioxide particles and carbon black particles, exclusive of said alumina particles.

2. A magnetic recording medium in accordance with claim 1 wherein;

said magnetic film further has a underneath magnetic layer.

3. A magnetic recording medium in accordance with claim 1 wherein;

said surface layer has a thickness in the range of from 0.4 μm to 0.6 μm and comprises magnetic powder for use in recording in a predetermined wave length.

4. A magnetic recording medium in accordance with claim 1 wherein;

said surface layer has a thickness in the range of from 0.2 μm to 0.4 μm and comprises magnetic powder for use in recording in short wave length region.

5. A magnetic recording medium in accordance with claim 1 wherein;

said spherical particles are surface treated with an agent for giving lubricity.

6. A magnetic recording medium in accordance with claim 1 wherein the spherical particles are spherical on a microscopic level.

7. A magnetic recording medium in accordance with claim 1 wherein the material which comprises the spherical particles is selected from 0.7 μm silicon dioxide particles, 0.2 μm silicon dioxide particles, 0.5 μm silicon dioxide particles, 0.67 μm thermal black particles or 0.15 μm thermal black particles.

8. A magnetic recording medium in accordance with claim 3 wherein;

said spherical particles has a diameter in the range of from 0.15 μm to 0.2 μm.

9. A magnetic recording medium in accordance with claim 3 wherein;

said spherical particles are surface treated with isopropyltrisostearolyl titanate.

10. A magnetic recording medium in accordance with claim 3 wherein;

said spherical particles are surface treated with a fatty acid having at least 12 carbon atoms and 3-aminopropyltriethoxysilane.

11. A magnetic recording medium in accordance with claim 4 wherein;

said spherical particles are surface treated with isopropyltrisostearoyl titanate.

12. A magnetic recording medium in accordance with claim 4 wherein;

said spherical particles are surface treated with a fatty acid having at least 12 carbon atoms and 3-aminopropyltriethoxysilane.

13. A magnetic recording medium in accordance with claim 8 wherein;

said agent is at least one member selected from the group consisting of:

p-phenethyltrimethoxysilane; N-(2-aminoethyl)-3-aminopropylmethyldimetoxysilane; N-(2-aminoethyl)-3-aminopropyltrimethoxysilane; 1-(3-aminopropyl)-1,1,3,3,3-pentamethyldisiloxane; 3-aminopropyltriethoxysilane; 3-aminopropyltris(trimethylsiloxy)silane; γ-(2-aminoethyl)aminopropyltrimethoxysilane; γ-(2-aminoethyl)aminopropylmethyldimethoxysilane; γ-glycidoxypropyltrimetoxysilane; γ-mercaptopropyltrimethoxysilane;

isopropyltriisostearoyltitanate; isopropyltris(diocthylpyrophoshate)titanate; isopropyltri(N-aminoethyl-aminoethyl)titanate; tetraocythylbis(ditridecylphosphate)titanate; bis(diocthylpyrophosphate)oxyacetatetitanate; bis(diocthylpyrophosphate)ethylenetitanate; isopropyltrioctanoyltitanate; isopropyltridecylbenzensulfonyltitanate; isopropyltri(diocthylphosphate)titanate; tetrapropylbis(dioctylphosphate)titanate;

a lubric acid, a myristic acid a palmitic acid, a stearic acid, an oleic acid, and a behenic acid wherein said acids have at least 12 carbon atoms.

14. A magnetic recording medium comprising, a non-magnetic substrate and a magnetic film which contains one or more layers and is present on one face of said non-magnetic substrate, said magnetic film having in said layers at least a surface magnetic layer which contains:

magnetic powder;

alumina particles; and spherical particles forming stud structures due to differences between the diameter of the spherical particles and the thickness of the surface magnetic layer wherein the spherical particles have diameters in the range of from 0.5 to 1.5 times as large as the thickness of said surface magnetic layer and are present in the surface magnetic layer in an amount within the range of from 0.1 parts to 1 part per 100 parts by weight of the magnetic powder, said spherical particles being selected from the group consisting of silicon dioxide particles and carbon black particles.

* * * * *